(12) United States Patent
Kakuta

(10) Patent No.: US 7,606,511 B2
(45) Date of Patent: Oct. 20, 2009

(54) OPENING AND CLOSING MECHANISM OF AN IMAGE FORMING DEVICE

(75) Inventor: Masayuki Kakuta, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 776 days.

(21) Appl. No.: 11/258,156

(22) Filed: Oct. 26, 2005

(65) Prior Publication Data

US 2007/0091387 A1    Apr. 26, 2007

(51) Int. Cl.
*G03G 15/00*    (2006.01)

(52) U.S. Cl. .................. 399/110; 399/124; 399/125; 267/154; 267/155

(58) Field of Classification Search ............... 399/110, 399/124, 125; 267/154, 155
See application file for complete search history.

(56) References Cited

U.S. PATENT DOCUMENTS

| | | | | |
|---|---|---|---|---|
| 4,437,178 A | * | 3/1984 | Miyoshi et al. | 369/75.11 |
| 5,041,818 A | * | 8/1991 | Liu | 361/681 |
| 5,240,319 A | * | 8/1993 | Koga | 312/319.2 |
| 5,737,805 A | * | 4/1998 | Xiao | 16/345 |
| 6,056,280 A | * | 5/2000 | Dials et al. | 267/155 |
| 7,360,734 B2 | * | 4/2008 | Hiraguchi | 242/338.1 |
| 2002/0122672 A1 | * | 9/2002 | Sasago et al. | 399/12 |
| 2004/0016675 A1 | * | 1/2004 | Chang | 206/756 |
| 2004/0184389 A1 | * | 9/2004 | Hope et al. | 369/262 |

FOREIGN PATENT DOCUMENTS

| | | | |
|---|---|---|---|
| JP | 57027281 A | * | 2/1982 |
| JP | 2004177424 A | * | 6/2004 |

OTHER PUBLICATIONS

JP 57027281 A, Usuki, Tomomichi—Abstract.*
JP 2004177424 A, Yomo, Masahito—Abstract.*

* cited by examiner

*Primary Examiner*—David M Gray
*Assistant Examiner*—Ryan D Walsh
(74) *Attorney, Agent, or Firm*—Shinjyu Global IP

(57) ABSTRACT

The automatic document transport device 2 comprises a device main body 4, an opening and closing body 20 pivotally supported by the device main body 4 about a support shaft 22 between a closed position and an open position, and a helical torsion coil spring 30 that urges the opening and closing body 20 positioned at the closed position in the open direction. The helical torsion coil spring 30 is provided and arranged at a position separate from the support shaft 22.

4 Claims, 7 Drawing Sheets

OPENING AND CLOSING MECHANISM OF AN IMAGE FORMING DEVICE

FIELD OF THE INVENTION

The present invention relates to an opening and closing device of, for example, an image forming device such as an electrostatic copying machine, and an automatic document transport device comprising an image forming device, wherein the opening and closing device comprises an opening and closing body pivotally supported by a device main body, and a helical torsion coil spring that urges the opening and closing body in the open direction.

BACKGROUND INFORMATION

An image forming device is conventionally known that is constituted so that a device main body comprises an upper structure and a lower structure, wherein the upper structure is openably and closably provided to the lower structure about the center of a support shaft, and a helical torsion coil spring is provided wound around the support shaft and urges the upper structure in the open direction. According to this device, the shock when closing the opened upper structure to the lower structure is absorbed by the force of the helical torsion coil spring.

Nevertheless, the support shaft constitutes a guide bar of the helical torsion coil spring because the helical torsion coil spring is provided in this device wound around the support shaft, and the shape of the helical torsion coil spring, such as the coil diameter and the wire diameter, is constrained by the shape of the support shaft, such as its outer diameter. Conversely, to ensure the required load of the helical torsion coil spring, the shape of the support shaft must match the shape of the helical torsion coil spring. Namely, mutual constraints arise when designing the support shaft and the helical torsion coil spring, which reduce the number of degrees of freedom in the design. In addition, there is a reduction in the number of degrees of freedom in the design from a layout standpoint because the position of the support shaft is limited to the positions that can support the helical torsion coil spring. Furthermore, the strength of the support shaft must be increased because of the load applied to the support shaft via the helical torsion coil spring when opening and closing the upper structure.

It is an object of the present invention to provide a novel opening and closing device that is capable of reducing the load on the support shaft, and wherein the support shaft and the helical torsion coil spring can be freely designed and disposed without mutual constraints.

SUMMARY OF THE INVENTION

The present invention provides an opening and closing device, comprising a device main body, an opening and closing body pivotally supported by the device main body about a support shaft between a closed position and an open position, and a helical torsion coil spring that urges the opening and closing body positioned at the closed position in the open direction, wherein, the helical torsion coil spring is provided and arranged at a position separate from the support shaft.

Preferably, the helical torsion coil spring is provided and arranged at a position wherein its axial center is not in line with the axial center of the support shaft.

Preferably, the helical torsion coil spring consists of a coil, one end part that extends outward from one end of the coil in a direction tangential to the coil, and an other end part that extends outward from the other end of the coil in a direction tangential to the coil; the coil of the helical torsion coil spring is pivotally held relative to the holding member, which is provided to and arranged on the opening and closing body or the device main body; the one end part of the helical torsion coil spring is movably mated and latched relative to and along a latching slot provided in the holding member, and extends outward from the holding member; the other end part extends outward from one end of the holding member and is movably held relative to a latching means, which is provided to and arranged on the device main body or the opening and closing body; in a state wherein the opening and closing body is positioned at the closed position, the one end part of the helical torsion coil spring pressure contacts one end of the latching slot of the holding member, which urges the opening and closing body in the open direction; and at the approximate angular area where the center of gravity of the opening and closing body goes beyond the support shaft in the open direction when the opening and closing body is pivoted from the closed position in the open direction, the one end part of the helical torsion coil spring separates from one end of the latching slot of the holding member, and the urging of the opening and closing body in the open direction by the helical torsion coil spring ceases until the opening and closing body reaches the open position.

Preferably, support shafts are provided and arranged so that they pivotally support both ends of the opening and closing body, and a plurality of helical torsion coil springs and holding members are provided and arranged mutually spaced apart between both sides of the opening and closing body.

Preferably, in a state wherein the opening and closing body is positioned at the closed position, the entirety of each helical torsion coil spring is positioned below the axis line of the support shaft outward in the radial direction; a flat surface is provided and arranged at a lower side position of the device main body corresponding to the other end part of each helical torsion coil spring; a rib that stands upright from the flat surface and extends in a position orthogonal to the other end part of each helical torsion coil spring is provided and arranged at an inner side position on the flat surface of the device main body to the inner side of the coil of each helical torsion coil spring; the latching means consists of a latching hole or a latching notch formed between the flat surface and the rib; the other end part of each helical torsion coil spring is inserted into and latched to the latching hole or the latching notch from the outer side to the inner side of the device main body; and, if the opening and closing body is pivoted from the closed position to the open position, then he other end part of each helical torsion coil spring is moved relative to the latching hole or the latching notch from the outer side to the inner side of the device main body in a state wherein the latching hole or the latching notch is latched.

DETAILED DESCRIPTION OF THE PREFERRED EMBODIMENTS

The following is a detailed description of the embodiments of an opening and closing device constituted according to the present invention, referencing the attached drawings.

Figure 1:
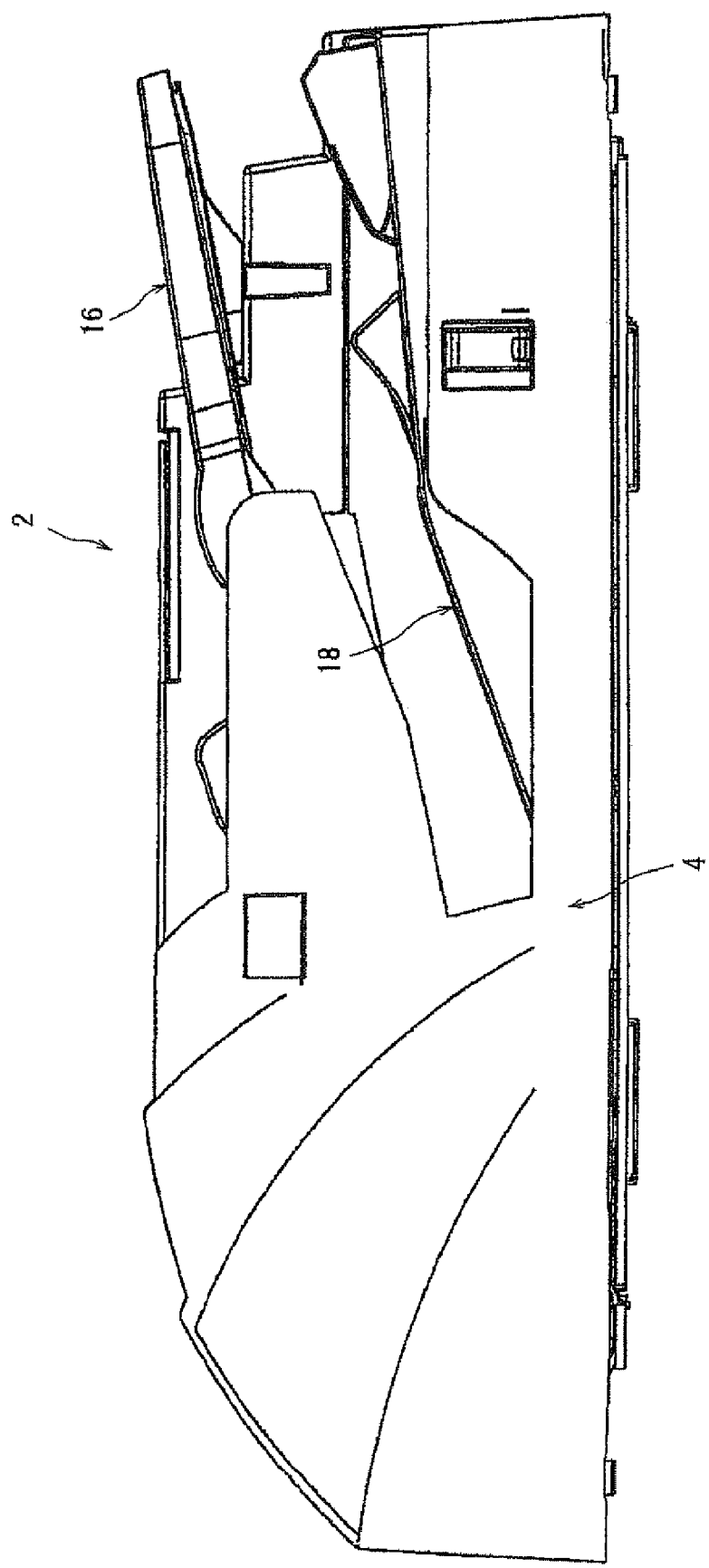
FIG. 1 is a front view that depicts an embodiment of an automatic document transport device, which is an opening and closing device according to the present invention, wherein an opening and closing body is depicted in a closed state.

FIG. 1 depicts an embodiment of an automatic document transport device 2, which is the opening and closing device according to the present invention. The automatic document transport device 2 is provided and arranged on the upper surface of a copying machine (not shown). A well known constitution may be used as the basic constitution of the automatic document transport device 2 itself, and the following is therefore a simple explanation of that constitution.

Figure 3:
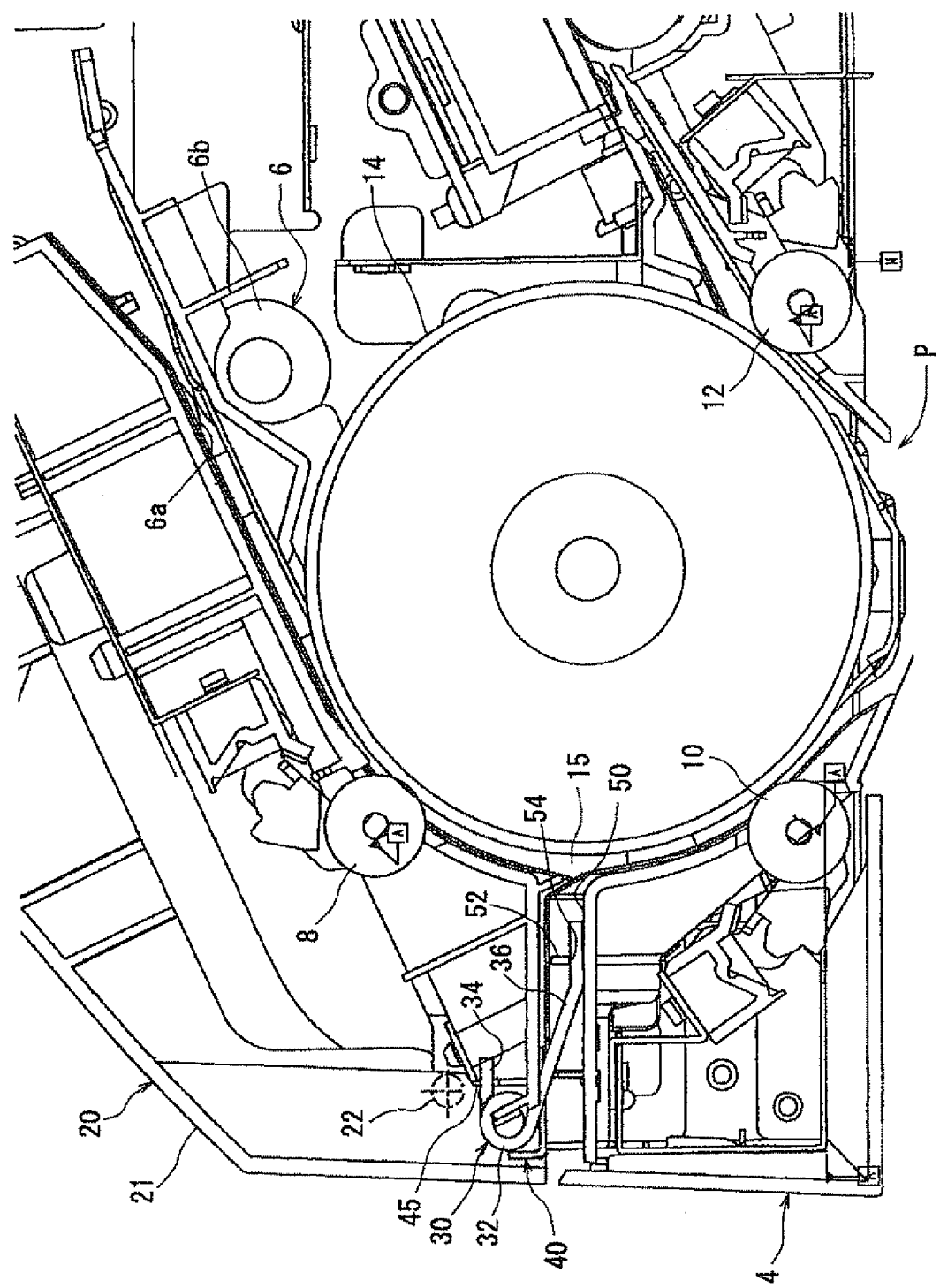
FIG. 3 is a cross sectional view of the principle components of the automatic document transport device depicted in FIG. 1.

Referencing FIG. 1 and FIG. 3, the automatic document transport device 2 comprises a device main body 4, which comprises: a pickup roller (not shown); a pair of feed rollers (pair of separation rollers; not shown), disposed on the downstream side of the pickup roller; pairs of resist rollers 6 disposed on the downstream side of the pair of feed rollers; and transport rollers 8, 10 and 12 disposed on the downstream side of the pairs of resist rollers 6. Each pair of resist rollers 6 comprises a follower rollers 6a and a driven roller 6b. A large diameter roller 14 is disposed above an image reading position P, which is formed cooperatively with the upper surface of the copying machine (not shown). Each of the transport rollers 8, 10, and 12 is in pressure contact with the outer circumferential surface of the large diameter roller 14. The pickup roller (not shown), the pair of feed rollers (not shown), the pairs of resist rollers 6, the transport rollers 8, the transport roller 10, and the transport roller 12 are disposed, in sequence from upstream to downstream, along a document transport path 15 of the automatic document transport device 2. A document feed table 16 is provided and disposed extending upward from the upstream end of the document transport path 15, and a document discharge tray 18 is provided and disposed extending upward from the downstream end of the document transport path 15. The document discharge tray 18 is disposed vertically below the document feed table 16. The document transport path 15 is curved so that it reverses direction in the space from the transport roller 8 to the image reading position P.

A document (not shown) set upon the document feed table 16 is transported along the document transport path 15 by each of the abovementioned rollers and discharged to the document discharge tray 18, but an image of the document is read while it passes through the image reading position P and a copy is made by the copying machine (not shown). Further explanation of such an operation is omitted because it is performed in a well-known manner and is not a feature of the present invention.

Figure 2:
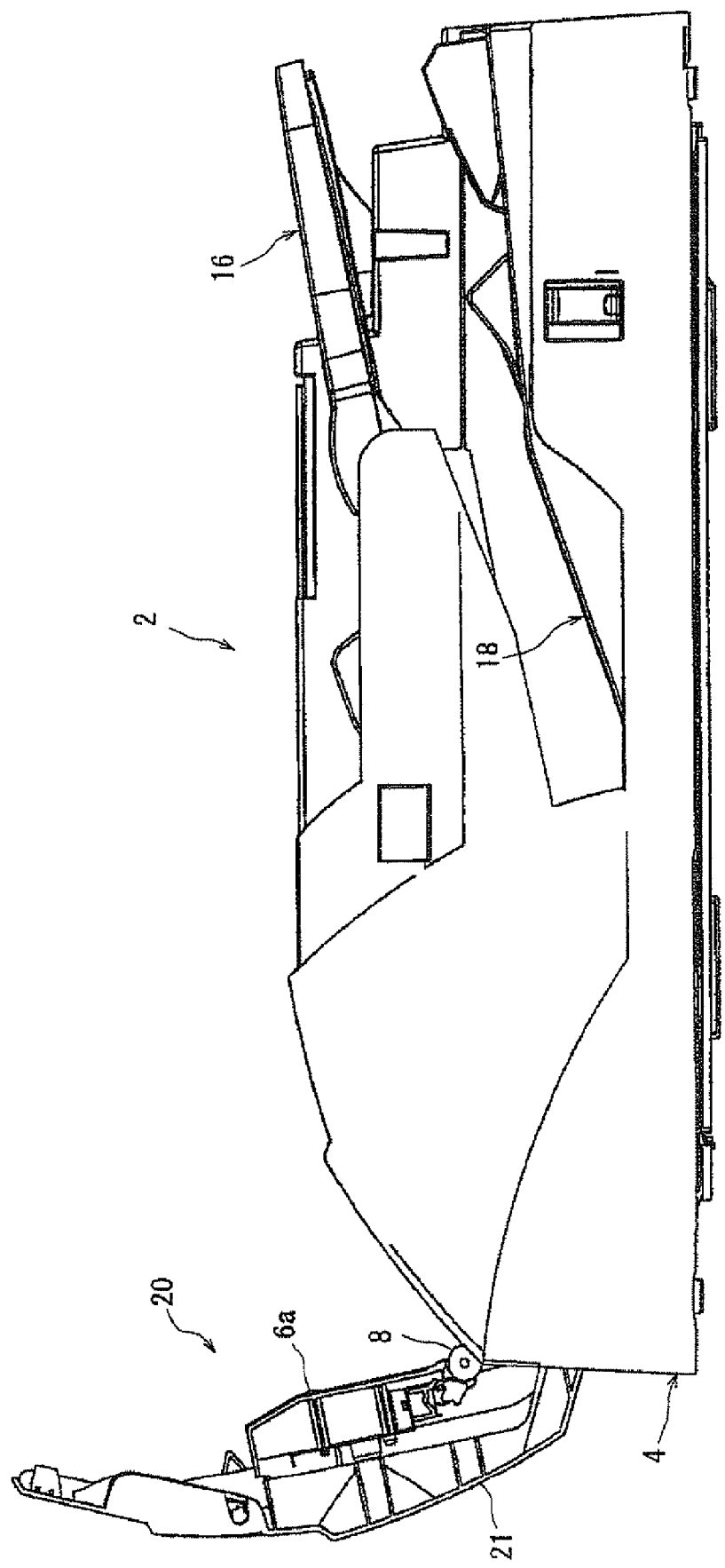
FIG. 2 is a front view of the automatic document transport device depicted in FIG. 1, wherein the opening and closing body is in an open state.
Figure 4:
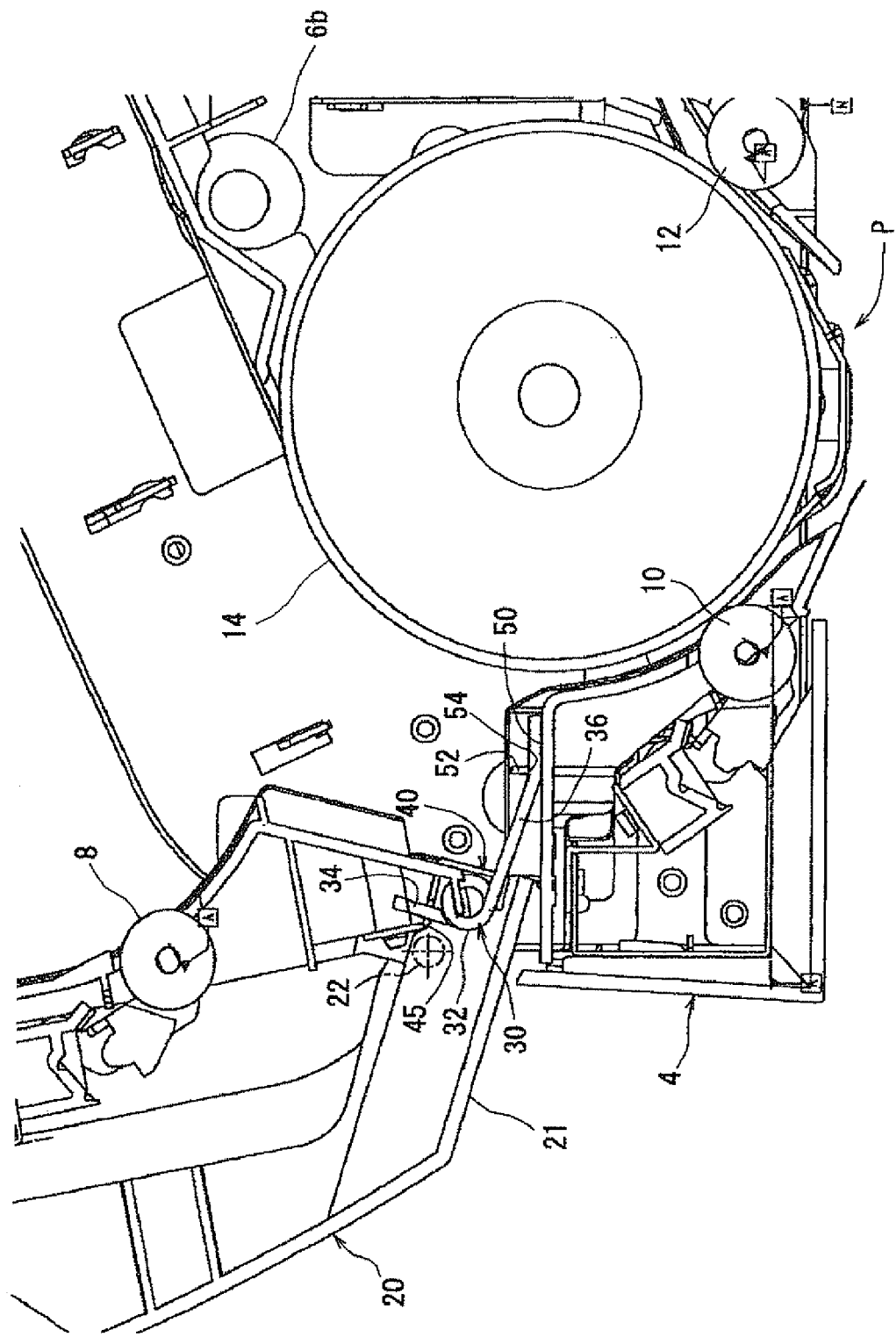
FIG. 4 is a cross sectional view of the principle components of the automatic document transport device depicted in FIG. 2.
Figure 5:
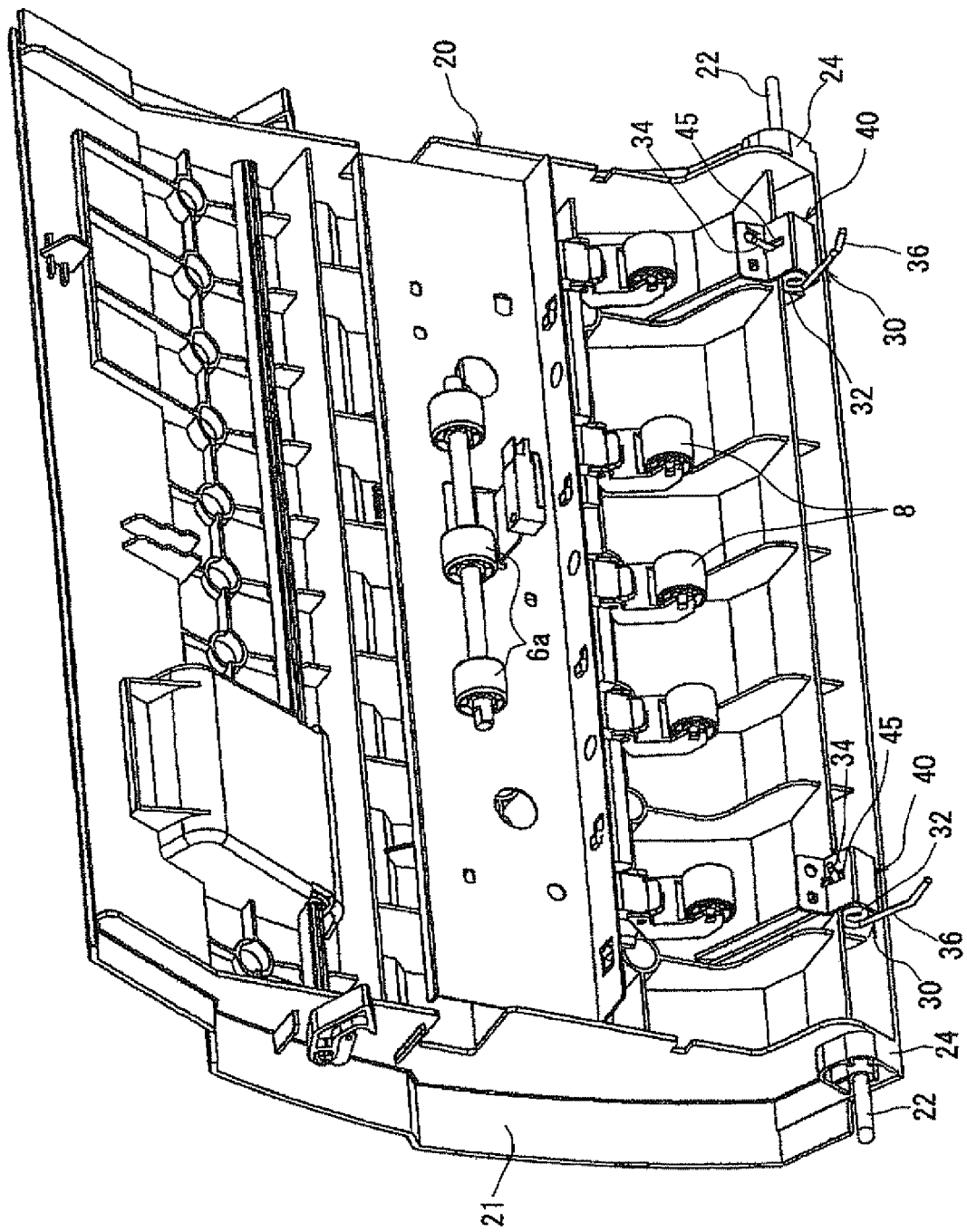
FIG. 5 is an oblique view of the opening and closing body depicted in FIG. 2.

Referencing FIG. 2, FIG. 3, and FIG. 5, an opening and closing body 20 is pivotally (openably and closably) supported, with a support shaft 22 as the pivot center, by the automatic document transport device 2 between a closed position (position depicted in FIG. 3) and an open position (position depicted in FIG. 4). The opening and closing body 20 has a main body 21, the entirety of which can be integrally formed from an appropriate synthetic resin, and the follower rollers 6a (three in the present embodiment) of the pairs of resist rollers 6 are rotatably provided and disposed through a common axle at the center area of the opening and closing body 20 in the width direction (the direction perpendicular to the paper surface in FIG. 2 and FIG. 3). In addition, each of the five transport rollers 8 in the present embodiment are rotatably supported by the main body 21 and spaced apart in the width direction. If the opening and closing body 20 is positioned at the closed position, then the tip surfaces of a plurality of ribs, which are provided on the inner side and on part of the inner side surface of the main body 21, cooperate with part of the area on the outer circumferential surface of the large diameter roller 14, and an upper area of the document transport path 15 is thereby formed. In addition, the follower roller 6a is brought into contact pressure with the driven roller 6b of each pair of resist rollers 6, and the transport rollers 8 are each brought into contact pressure with the large diameter roller 14. If the opening and closing body 20 is positioned at the open position as depicted in FIG. 4, then the follower rollers 6a of the pairs of resist rollers 6 are spaced apart upward from the driven rollers 6b, the transport rollers 8 are spaced apart upward from the large diameter roller 14, and the upper area of the document transport path 15 is thereby opened upwardly. As a result, it is easy to handle jams that occur in the document transport path 15.

Referencing FIG. 3 and FIG. 5, support shafts 22 are provided and arranged so that each pivotally supports one side of the opening and closing body 20. More specifically, a bearing 24, which has a bearing hole that opens outwardly to the side, is integrally provided and arranged at each side of the lower end of the main body 21. In an aspect not shown, the bearing hole of each bearing 24 is detachably fixed to the side of the device main body 4, and is pivotally supported by the pair of support shafts 22, and the opening and closing body 20 is thereby pivotally supported by the device main body 4 around each of the support shafts 22 between the closed position and the open position. Furthermore, each of the support shafts 22 is naturally positioned along a substantially common axis line.

Helical torsion coil springs 30, which urge the opening and closing body 20 (positioned at the closed position) in the open direction (the counterclockwise direction in FIG. 3) about the support shafts 22, are provided to the main body 21 of the opening and closing body 20. The plurality of helical torsion coil springs 30 (two in the present embodiment) are provided and arranged at separate positions with respect to each of the support shafts 24. Namely, the helical torsion coil springs 30, along with the holding members 40, are provided and arranged mutually spaced apart within an area between both sides of the main body 21 (within an area between the bearings 24). Both helical torsion coil springs 30 are made of interchangeable common parts, and all holding members 40 are made of interchangeable common parts.

Figure 6:
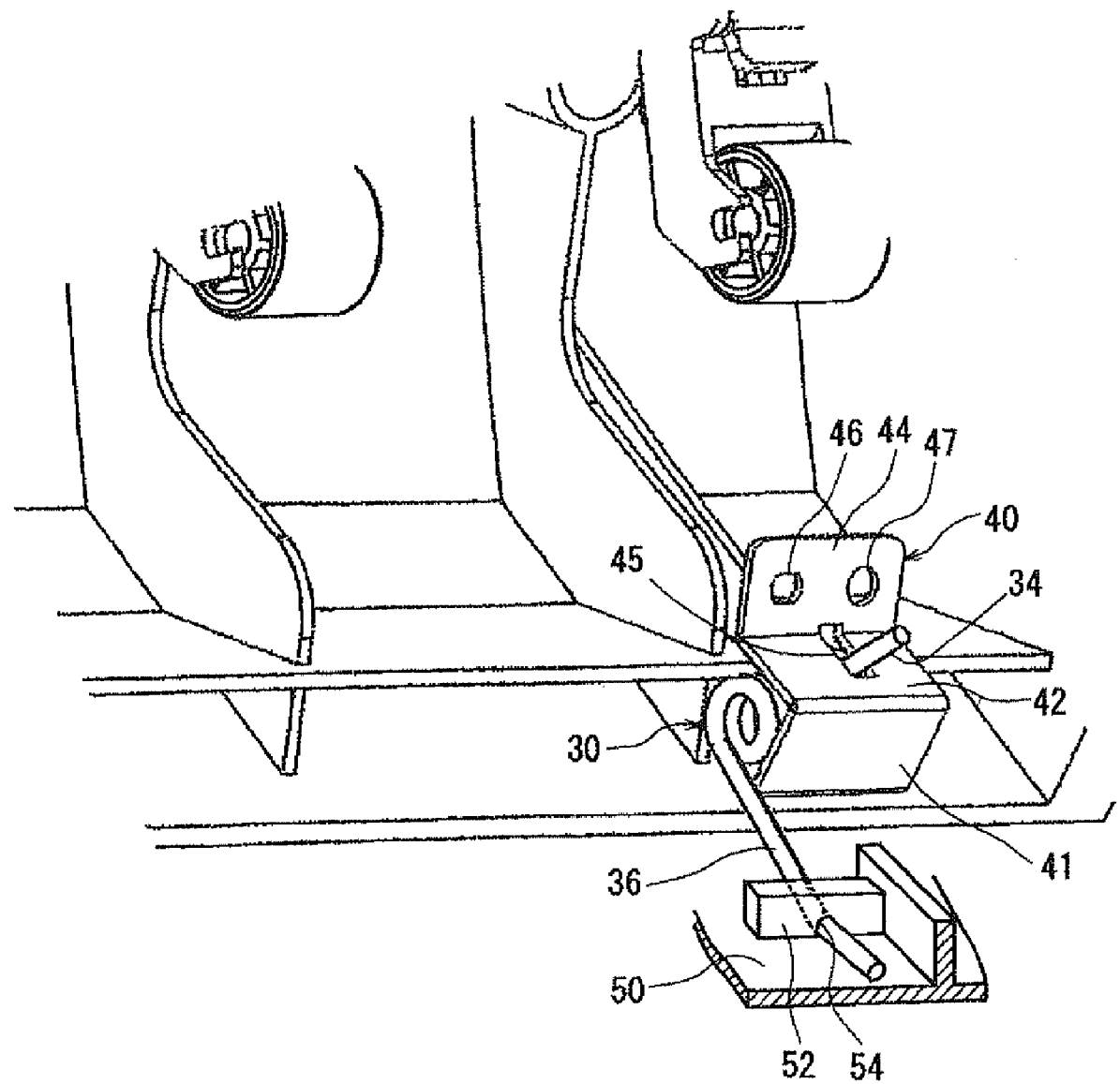
FIG. 6 is an oblique view that depicts a helical torsion coil spring and a holding member in a mounted state.
Figure 7:
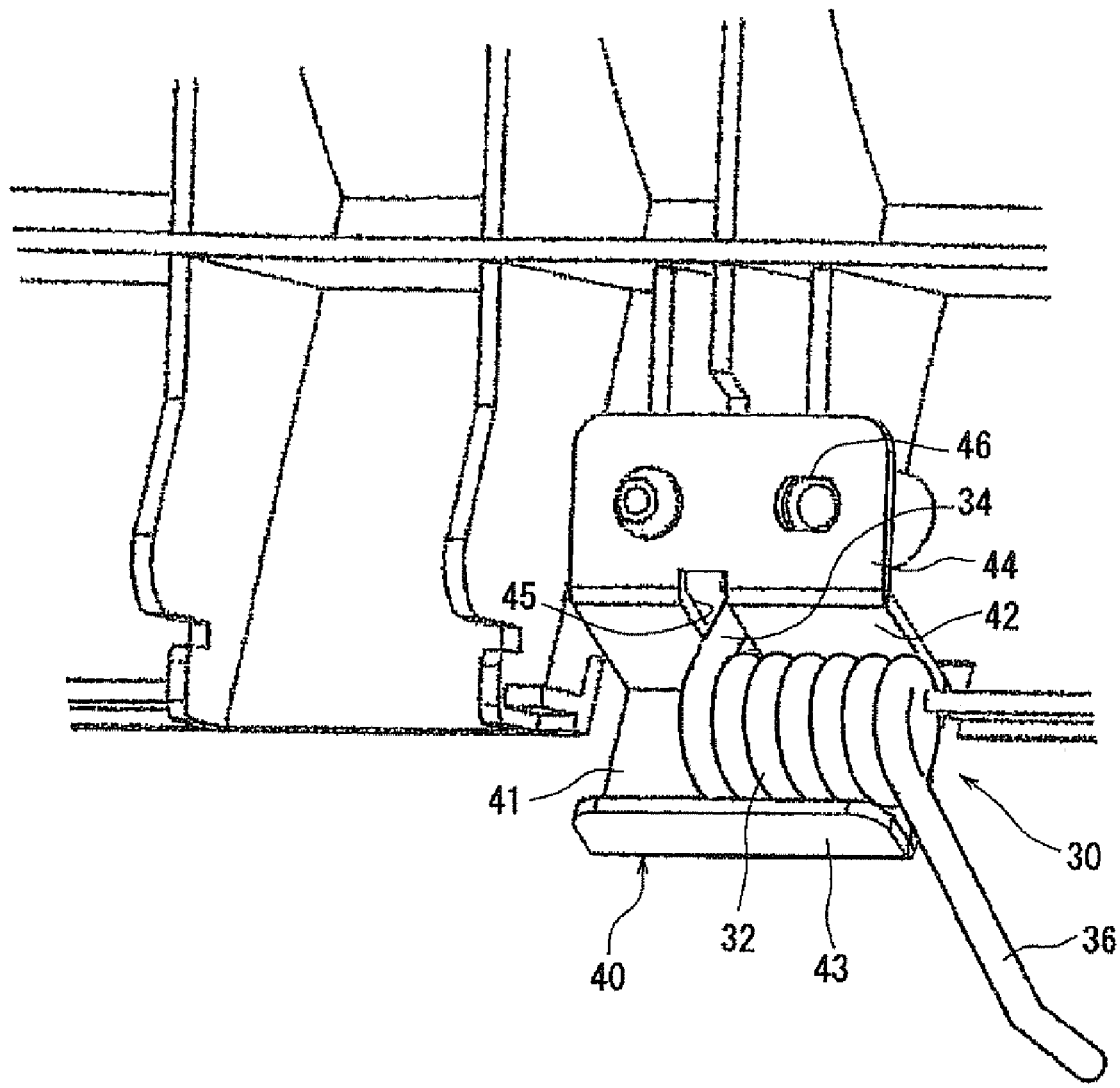
FIG. 7 is an oblique view of the helical torsion coil spring and the holding member depicted in FIG. 6, viewed from the rear side of the paper surface in FIG. 6.

Referencing FIG. 6 and FIG. 7, each helical torsion coil spring 30 consists of a coil 32, one end part 34 that extends linearly from one end of the coil 32 in a direction tangential thereto, and an other end part 36 that extends from the other end of the coil 32 in a direction tangential thereto. The other end part 36 consists of a base area that extends linearly outward in a direction tangential to the coil 32, and a tip area that extends linearly from the tip of the base area and is bent by just a small angle with respect to the base area.

Each holding member 40, which is formed by bending sheet metal formed in substantially a rectangle, comprises a bottom wall 41, a pair of side walls 42 and 43 that are stood upright so that they are mutually opposing from both sides of the bottom wall 41, a mounting flange 44 that extends diagonally upward from the upper end of one side wall 42 in a direction opposite the other side wall 43. The height of one side wall 42 from the bottom wall 41 is greater than that of the other side wall 43. A channel is formed by the bottom wall 41 and the pair of side walls 42 and 43. A latching slot 45 is formed at substantially the center of the holding member 40 in the longitudinal direction (the lateral direction in FIG. 7). The latching slot 45, which as a whole substantially forms a rectangle, is formed with a fixed spacing in the longitudinal direction so that it extends spanning the mounting flange 44 and the other side wall 42. In the present embodiment, one end of the latching slot 45 is in the mounting flange 44 at a position near the upper end of one side wall 42, and the other end is at a position slightly toward the bottom wall 41 from the center of the one side wall 42 in the height direction. Two mounting holes 46 and 47 are formed in the mounting flange 44.

The spacing between side walls 42, 43 of the holding member 40, and the height of the side wall 42 from the bottom wall 41 are each formed greater than the diameter of the coil 32 (the coil diameter) of the helical torsion coil spring 30, and the height of the other side wall 43 of the holding member 40 from the bottom wall 41 is set substantially the same as the radius of the coil 32 of the helical torsion coil spring 30. The length of the holding member 40 (the length in the lateral direction in FIG. 7) is formed greater than the length of the coil 32 of the helical torsion coil spring 30 in the axial direction. The gap of the latching slot 45 in the longitudinal direction of the holding member 40 is formed slightly greater than the diameter of one end part 34 of the helical torsion coil spring 30 (the wire diameter).

The coil 32 of the helical torsion coil spring 30 is pivotally positioned relatively about the axis line of the coil 32 within the channel formed by the bottom wall 41 and the pair of side walls 42 and 43 of the holding member 40, and the one end part 34 of the helical torsion coil spring 30 is movably mated and latched relatively along the latching slot 45 provided in the holding member 40. The one end part 34 of the helical torsion coil spring 30 passes through the latching slot 45 and extends outward of one side wall 42 of the holding member 40. The other end part 36 of the helical torsion coil spring 30 extends substantially outwardly of the bottom wall 41 from one end of the holding member 40 (the right edge in FIG. 7). Thus, the coil 32 of the helical torsion coil spring 30, i.e., the helical torsion coil spring 30, is pivotally held relative to the holding member 40. The movement of the helical torsion coil spring 30 in the longitudinal direction of the holding member 40 is limited by the fact that the one end part 34 of the helical torsion coil spring 30 is mated and latched to the latching slot 45 of the holding member 40.

The holding members 40, wherein the helical torsion coil springs 30 are held, are attached mutually spaced apart by bolts (not shown) via the mounting holes 46 and 47 of the mounting flanges 44 within an area between both sides of the main body 21 (within an area between the bearings 24). The axis line of the coil 32 of each of the helical torsion coil springs 30 is positioned along substantially a common axis line.

In a state wherein the opening and closing body 20 is positioned in the closed position as depicted in FIG. 3, the entirety of each of the helical torsion coil springs 30 is positioned below the axis line of the support shaft 22 outwardly in the radial direction. On the other hand, a flat surface 50 (a horizontal surface in the present embodiment) is provided to and arranged on the device main body 4 at the lower side position corresponding to the other end part 36 of each of the helical torsion coil springs 30. A rib 52 is provided to each flat surface 50 and arranged standing upright therefrom, as depicted in FIG. 6, at an inner side position of the device main body (position on the right side of the device main body 4 in FIG. 3), to the inner side of the coil 32 of the corresponding helical torsion coil spring 30, and extends in a direction orthogonal to the other end part 36 of the helical torsion coil spring 30. A latching hole 54, which constitutes a latching means, is formed between the flat surface 50 and the rib 52. The inner diameter of the latching hole 54 is formed slightly greater than the wire diameter of the other end part 36 of the helical torsion coil spring 30.

The tip area of the other end part 36 of each helical torsion coil spring 30 is inserted from the outer side (left side in FIG. 3) toward the inner side (the right side in FIG. 3) of the device main body 4 and latched to the corresponding latching hole 54. The tip area of the other end part 36 of each helical torsion coil spring 30 is movable, relative to the lateral direction in FIG. 3, with respect to the corresponding latching hole 54. Furthermore, there is also another embodiment wherein the tip area of the other end part 36 of each helical torsion coil spring 30 is movable relative to the extending direction thereof instead of to the latching hole 54, and a latching notch (not shown), wherein the tip area is mated and latched so that it does not come out in the outward radial direction, is formed in the rib 52.

As mentioned above, the one end part 34 of each helical torsion coil spring 30 contacts and presses one end (the upper end in FIG. 3) of the latching slot 45 of the corresponding holding member 40. In a state wherein the opening and closing body 20 is positioned at the closed position, each helical torsion coil spring 30 is twisted between the one end part 34 and the other end part 36, and the opening and closing body 20 is therefore urged so that it pivots in the open direction (in the counterclockwise direction in FIG. 3) around each of the support shafts 22. The one end part 34 and the tip area of the other end part 36 of each helical torsion coil spring 30 extend substantially parallel with a spacing in the vertical direction, viewed in the axis line direction of the coil 32. The tip area of the other end part 36 of each helical torsion coil spring 30 is brought into pressure contact with the corresponding flat surface 50 of the device main body 4.

Referencing FIG. 3 and FIG. 4, a locking means (not shown) is provided and arranged between the opening and closing body 20 and the device main body 4, wherein the opening and closing body 20 is releasably locked at the closed position (the position depicted in FIG. 3) with respect to the device main body 4. When the lock is released by the locking means, the opening and closing body 20 pivots from the closed position toward the open position (the position depicted in FIG. 4) about each of the support shafts 22 in the counterclockwise direction in FIG. 3; when the center of gravity of the opening and closing body 20 goes beyond the support shafts 22 in the open direction, the torque due to the self weight of the opening and closing body 20 acts so that the opening and closing body 20 pivots in the open direction about the support shafts 22. At the approximate angular area where the center of gravity of the opening and closing body 20 goes beyond the support shafts 22 in the open direction (immediately after where the center of gravity of the opening and closing body 20 has gone beyond the support shafts 22 in the open direction in the present embodiment), the one end part 34 of each helical torsion coil spring 30 separates from one end of the latching slot 45 of each holding member 40 in the other end direction of the latching slot 45, and therefore the spring force of each helical torsion coil spring 30 that urges the opening and closing body 20 in the open direction to the device main body 4 about each of the support shafts 22 ceases. Thereafter, the opening and closing body 20 is pivoted to the open position, without being urged in the open direction by the spring force of the helical torsion coil springs 30. The opening and closing body 20 is positioned at a predetermined open position (refer to FIG. 4) by a stopping means (not shown), which is provided and arranged between the opening and closing body 20 and the device main body 4.

While the opening and closing body 20 is pivoted from the closed position to the open position, each of the helical torsion coil springs 30 and the holding members 40 are pivoted about the support shafts 22, and the relative movement between the coil 32 of each helical torsion coil spring 30 and the channel of each holding member 40 is absorbed by the gap therebetween. The relative movement between the latching slot 45 and the one end part 34 of each helical torsion coil spring 30 is absorbed by the gap of the latching slot 45 in the longitudinal direction. In addition, the relative movement between the other end part 36 of each helical torsion coil spring 30 and the corresponding latching hole 54 of the device main body 4 is absorbed by causing the relative movement of the other end part 36, rightward in FIG. 3, inside the latching hole 54 along the flat surface 50. The tip area of the other end part 36 of each helical torsion coil spring 30 extends along the flat surface 50 and does not project upwards in a state wherein the opening and closing body 20 is positioned at the open position, and therefore the users hand is prevented from touching the tip (cross sectional surface) of the other end part 36 when he or she handles the jam.

Thus, according to the present invention, while the torque due to the self weight of the opening and closing body 20 acts to pivot the opening and closing body 20 in the closed direction about each of the support shafts 22, the spring force of the helical torsion coil springs 30 act in the open direction, and therefore the force to open the opening and closing body 20 is reduced, even if it is heavy. In addition, the torque due to the self weight of the opening and closing body 20 acts so that it is pivoted in the open direction about each of the support shafts 22, and, substantially simultaneous therewith, the urging in the open direction due to the spring force of the coil springs 30 ceases, which softens the shock when the opening and closing body 20 is pivoted to the open position. Furthermore, assembly is simplified because the opening and closing body 20 has a pivoting position where the spring force of the helical torsion coil springs 30 does not act in the open direction.

Conversely, if the opening and closing body 20 is pivoted from the open position toward the closed position, and the center of gravity of the opening and closing body 20 goes beyond the support shafts 22 in the closed direction, then the torque due to the self weight of the opening and closing body 20 acts so that the opening and closing body 20 is pivoted in the closed direction about each of the support shafts 22. Immediately before the center of gravity of the opening and closing body 20 goes beyond the support shafts 22 in the closed direction, the one end part 34 of each helical torsion coil spring 30 is brought into contact with one end of the latching slot 45 of the holding member 40, and therefore the spring force of the helical torsion coil spring 30 that urges the opening and closing body 20 to the device main body 4 in the open direction begins to act. Thereafter, the opening and closing body 20 is pivoted to the closed position against the urging of the spring force of the helical torsion coil springs 30 in the open direction until it reaches the closed position. If the opening and closing body 20 is pivoted to the closed position, then it is locked to the device main body 4 in the closed position by the locking means (not shown). While the opening and closing body 20 is pivoted from the open position to the closed position, the relative movement between the other end part 36 of each helical torsion coil spring 30 and the corresponding latching hole 54 of the device main body 4 is absorbed by the relative movement of the tip area of the other end 36, leftward in FIG. 4, inside the latching hole 54 along the flat surface 50.

Thus, according to the present invention, the spring force of the helical torsion coil springs 30 that urges the opening and closing body 20 to the device main body 4 in the open direction begins to act substantially simultaneous (immediately before in the present embodiment) with the torque, due to the self weight of the opening and closing body 20, acting to pivot the opening and closing body 20 in the open direction about the support shafts 22, which softens the shock when the opening and closing body 20 pivots to the closed position.

Each of the support shafts 22 and helical torsion coil springs 30 can be flexibly designed and placed, without mutual constraints, because the helical torsion coil springs 30 in the present invention are provided and arranged at a position separate from the support shafts 22. Specifically, to soften the shock when the opening and closing body 20 pivots to the closed position, it is possible to achieve a flexible design in accordance with the weight of the opening and closing body 20, and the like, without being constrained by the shape of the support shafts 22 when providing and arranging the helical torsion coil springs 30.

It is also possible to achieve a flexible design without mutual constraints because the axial center of each helical torsion coil spring 30 in the present embodiment is arranged at a position that is not in line with the axial center of the support shafts 22.

Further, the support shafts 22 in the present invention are provided and arranged so that they pivotally support both sides of the opening and closing body 20, and a plurality of the helical torsion coil springs 30 and the holding members 40 are provided and arranged mutually spaced apart in an area between both sides of the opening and closing body 20. Thus, if there is a limitation on the size of the helical torsion coil springs 30, then the required load can still be easily ensured by providing numerous helical torsion coil springs 30. In addition, it is possible to dispose the one end parts 34, which exerts the load of the helical torsion coil springs 30 upon the opening and closing body 20, at a position so that they act upon the opening and closing body 20 in a well balanced fashion (if constituted so that both sides of the opening and closing body 20 are supported by each of the support shafts 22, then there is a risk that the opening and closing body 20 will twist if the position at which the load of the helical torsion coil springs 30 acts is biased to one side).

Furthermore, although the helical torsion coil springs 30 and the holding members 40 are provided and arranged on the opening and closing body 20 side in the abovementioned embodiments, there is also another embodiment wherein they are provided and arranged on the device main body 4 side.

What is claimed is:

1. An opening and closing device, comprising:
   a device main body;
   an opening and closing body pivotally supported by the device main body about a support shaft between a closed position and an open position; and
   a helical torsion coil spring that urges the opening and closing body positioned at the closed position in the open direction, wherein the helical torsion coil spring is provided and arranged at a position separate from the support shaft, the helical torsion coil spring consisting of:

a coil;

one end part that extends outward from one end of the coil in a direction tangential to the coil; and an other end part that extends outward from the other end of the coil in a direction tangential to the coil;

the coil of the helical torsion coil spring is pivotally held relative to a holding member, which is provided to and arranged on the opening and closing body or the device main body;

the one end part of the helical torsion coil spring is movably mated and latched relative to and along a latching slot provided in the holding member, and extends outward from the holding member;

the other end part extends outward from one end of the holding member and is movably held relative to a latching means, which is provided to and arranged on the device main body or the opening and closing body;

in a state wherein the opening and closing body is positioned at the closed position, the one end part of the helical torsion coil spring pressure contacts one end of the latching slot of the holding member, which urges the opening and closing body in the open direction; and at the approximate angular area where the center of gravity of the opening and closing body goes beyond the support shaft in the open direction when the opening and closing body is pivoted from the closed position in the open direction, the one end part of the helical torsion coil spring separates from one end of the latching slot of the holding member, and the urging of the opening and closing body in the open direction by the helical torsion coil spring ceases until the opening and closing body reaches the open position.

2. An opening and closing device as recited in claim 1, wherein the helical torsion coil spring is provided and arranged at a position wherein its axial center is not in line with the axial center of the support shaft.

3. The opening and closing device as recited in claim 1, wherein support shafts are provided and arranged so that they pivotally support both ends of the opening and closing body; and a plurality of helical torsion coil springs and holding members are provided and arranged mutually spaced apart between both sides of the opening and closing body.

4. The opening and closing device as recited in claim 3, wherein in a state wherein the opening and closing body is positioned at the closed position, the entirety of each helical torsion coil spring is positioned below the axis line of the support shaft outward in the radial direction;

a flat surface is provided and arranged at a lower side position of the device main body corresponding to the other end part of each helical torsion coil spring;

a rib that stands upright from the flat surface and extends in a position orthogonal to the other end part of each helical torsion coil spring is provided and arranged at an inner side position on the flat surface of the device main body to the inner side of the coil of each helical torsion coil spring;

the latching means consists of a latching hole or a latching notch formed between the flat surface and the rib;

the other end part of each helical torsion coil spring is inserted into and latched to the latching hole or the latching notch from the outer side to the inner side of the device main body; and if the opening and closing body is pivoted from the closed position to the open position, then the other end part of each helical torsion coil spring is moved relative to the latching hole or the latching notch from the outer side to the inner side of the device main body in a state wherein the latching hole or the latching notch is latched.

* * * * *